(12) United States Patent
Fong et al.

(10) Patent No.: US 8,631,351 B2
(45) Date of Patent: Jan. 14, 2014

(54) PROVIDING MULTIPLE DEGREES OF CONTEXT FOR CONTENT CONSUMED ON COMPUTERS AND MEDIA PLAYERS

(75) Inventors: Jeffrey C. Fong, Seattle, WA (US); Anton O. Andrews, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 651 days.

(21) Appl. No.: 12/164,084

(22) Filed: Jun. 29, 2008

(65) Prior Publication Data

US 2009/0327941 A1    Dec. 31, 2009

(51) Int. Cl.
*G06F 3/048*    (2013.01)
(52) U.S. Cl.
USPC ........... 715/834; 715/765; 715/811; 715/802; 715/854
(58) Field of Classification Search
USPC ......... 715/765, 825, 834, 836, 848–852, 853, 715/811, 854
See application file for complete search history.

(56) References Cited

U.S. PATENT DOCUMENTS

| | | | |
|---|---|---|---|
| 6,285,367 B1 * | 9/2001 | Abrams et al. | 715/854 |
| 6,421,305 B1 | 7/2002 | Gioscia et al. | |
| 6,469,749 B1 | 10/2002 | Dimitrova et al. | |
| 6,990,312 B1 | 1/2006 | Gioscia et al. | |
| 7,350,158 B2 * | 3/2008 | Yamaguchi et al. | 715/834 |
| 7,418,671 B2 * | 8/2008 | Hama et al. | 715/830 |
| D613,300 S * | 4/2010 | Chaudhri | D14/488 |
| 7,797,641 B2 * | 9/2010 | Karukka et al. | 715/802 |
| 7,865,841 B2 * | 1/2011 | Morikawa | 715/811 |
| 8,032,472 B2 * | 10/2011 | Tsui et al. | 706/46 |
| 2002/0033848 A1 * | 3/2002 | Sciammarella et al. | 345/838 |
| 2003/0202016 A1 | 10/2003 | Acton | |
| 2004/0177149 A1 | 9/2004 | Zullo et al. | |
| 2004/0209230 A1 * | 10/2004 | Beu et al. | 434/72 |
| 2004/0215657 A1 | 10/2004 | Drucker et al. | |
| 2004/0221243 A1 * | 11/2004 | Twerdahl et al. | 715/834 |

(Continued)

FOREIGN PATENT DOCUMENTS

| | | |
|---|---|---|
| JP | 2000-284879 | 10/2000 |
| JP | 2007-524898 | 8/2007 |

(Continued)

OTHER PUBLICATIONS

International Search Report from corresponding PCT Application PCT/US2009/048905, dated Feb. 16, 2010, 3 pages.

(Continued)

*Primary Examiner* — Omar Abdul-Ali
*Assistant Examiner* — Sherrod Keaton
(74) *Attorney, Agent, or Firm* — Mayer & Williams PC (57) ABSTRACT

Multiple degrees of context for media content that is consumable on computing platforms including PCs and personal media players is provided by logically organizing context objects into halos that surround each piece of consumable content. The context objects represent information and experiences that are contextually associated with media content to enable users to easily discover content and experiences that they will find interesting in a rich and personal manner. As a user navigates from a content item to a context object in the halo, the context object itself morphs into content that is then surrounded by a new halo of context objects to which the user may navigate. The organization of media content and information into halos enables an effective contextual paradigm that cuts across strict hierarchical structures to allow the user experience to be much more seamless and free-flowing.

13 Claims, 10 Drawing Sheets

(56) References Cited

U.S. PATENT DOCUMENTS

| | | | |
|---|---|---|---|
| 2004/0250217 A1* | 12/2004 | Tojo et al. | 715/810 |
| 2005/0086611 A1* | 4/2005 | Takabe et al. | 715/823 |
| 2006/0069998 A1 | 3/2006 | Artman et al. | |
| 2006/0173974 A1 | 8/2006 | Tang | |
| 2006/0212444 A1 | 9/2006 | Handman et al. | |
| 2007/0083611 A1 | 4/2007 | Farago et al. | |
| 2007/0150810 A1* | 6/2007 | Katz et al. | 715/526 |
| 2007/0168388 A1 | 7/2007 | Plastina et al. | |
| 2007/0168879 A1* | 7/2007 | Reville et al. | 715/810 |
| 2007/0199021 A1 | 8/2007 | Kim et al. | |
| 2007/0240190 A1 | 10/2007 | Arseneau et al. | |
| 2008/0235629 A1* | 9/2008 | Porter et al. | 715/849 |
| 2008/0250312 A1* | 10/2008 | Curtis | 715/700 |

FOREIGN PATENT DOCUMENTS

| | | |
|---|---|---|
| JP | 2007-226855 | 9/2007 |
| JP | 2008-515041 | 5/2008 |
| WO | 2006/126050 | 11/2006 |
| WO | 2007/125649 | 11/2007 |
| WO | 2008/033853 | 3/2008 |

OTHER PUBLICATIONS

Ward III, Jack W., "The Effects of Contextual Descriptive Information on User Perceptions of a Music Information Retrieval Interface used for Known-Item and Exploratory Search Tasks", Apr. 2006, 50 pages.

Lee et al., "Survey of Music Information Needs, Uses, and Seeking Behaviours: Preliminary Findings", In Proceedings of ISMIR'2004, 8 pages.

Chinese Office Action dated Nov. 22, 2012 in connection with corresponding Chinese Patent Application No. 200980126109.7 (3 pages).

Reynolds et al., "Towards a Personal Automatic Music Playlist Generation Algorithm: The Need for Contextual Information", The Proceedings of the Audio Mostly: Interaction with Sound Conference, (2007), pp. 84-89.

Japanese Office Action issued Aug. 22, 2013 and mailed on Aug. 26, 2013 in connection with corresponding Japanese Patent Application No. 2011-516720 with English language translation (12 pages total).

* cited by examiner

PROVIDING MULTIPLE DEGREES OF CONTEXT FOR CONTENT CONSUMED ON COMPUTERS AND MEDIA PLAYERS

BACKGROUND

Personal computers ("PCs") and personal media players such as MP3 (Moving Pictures Expert Group, MPEG-1, audio layer 3) players, PDAs (personal digital assistants), mobile phones, smart phones, and similar devices typically enable users to interact with and consume media content such as music and video. Users typically utilize a graphical user interface ("GUI") supported by a display screen that is incorporated into these devices in order to navigate among various menus to make selections of media content, control operations of the device, set preferences, and the like. The menus are organized in a hierarchical manner and the user will generally interact with user controls (e.g., buttons and the like) to move within a menu and jump to different menus to accomplish the desired functions such as finding media content items of interest and related contextual information to consume.

While many current GUIs perform satisfactorily, it continues to be a challenge for developers to design GUIs that are easily and efficiently used, and engage the user in way that enhances the overall user experience. In particular, as both PCs and personal media players get more onboard storage and support more features and functions, the GUIs needed to control them have often become larger and more complex to operate. For example, PCs and media players can store thousands of songs, videos, and photographs, play content from over the air radio stations, access content and data from on-line sources, and enable shared experiences through device-to-device connections.

Accordingly, arrangements supporting media content and associated contextual information and experiences that are more seamless in operation and intuitive to use and which provide a user with a better overall experience when interacting with the player would be desirable.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Multiple degrees of context for media content that is consumable on computing devices including PCs and personal media players is provided by logically organizing context objects into halos that surround each piece of consumable content. The context objects represent information and experiences that are contextually associated with content items (i.e., items of entertainment) to enable users to easily new discover content and experiences that they will find interesting in a rich and personal manner. As a user navigates from a content item to a context object in the halo, the context object itself morphs into a content item that is then surrounded by a new halo of context objects to which the user may navigate. The organization of media content and information into halos enables an effective contextual paradigm that cuts across strict hierarchical structures to allow the user experience to be much more seamless and free-flowing.

In various illustrative examples, context objects may represent static content, dynamic content and interactive experiences, content that is culled from the web, user contributions and additions, commercial content, and content relating to a community of users or a given user's social graph. On a GUI supported by the device, context objects may be displayed on screen or just off screen to be readily accessed and manipulated to be brought into focus for consumption or interaction.

When the PC and personal media player are operatively connected to an on-line or cloud-based media content delivery service, multiple degrees of context are typically provided using large halos of objects. When the personal media player is in a disconnected state while its user is on the go, multiple degrees of context may still be provided, but will typically use smaller halos of objects that are associated with locally stored and accessed media content. Data pre-fetching may be utilized in accordance with various algorithms to maximize the size of the halo when the player is in a disconnected state.

Advantageously, the present arrangement for providing multiple degrees of context concentrates content and context in one platform (i.e., either the PC or personal media player) to enable exploration of the related contextual materials that is in-line and in-time with the user experience. In addition, the service may be utilized to keep the content items and context objects fresh and up to date.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

FIG. 4 shows a typical hierarchical arrangement by which a user may navigate among various menus to make selections of media content, control operation of the portable media player, set preferences, and the like;

Like reference numerals indicate like elements in the drawings. Elements are not drawn to scale unless otherwise indicated.

DETAILED DESCRIPTION

Figure 1:
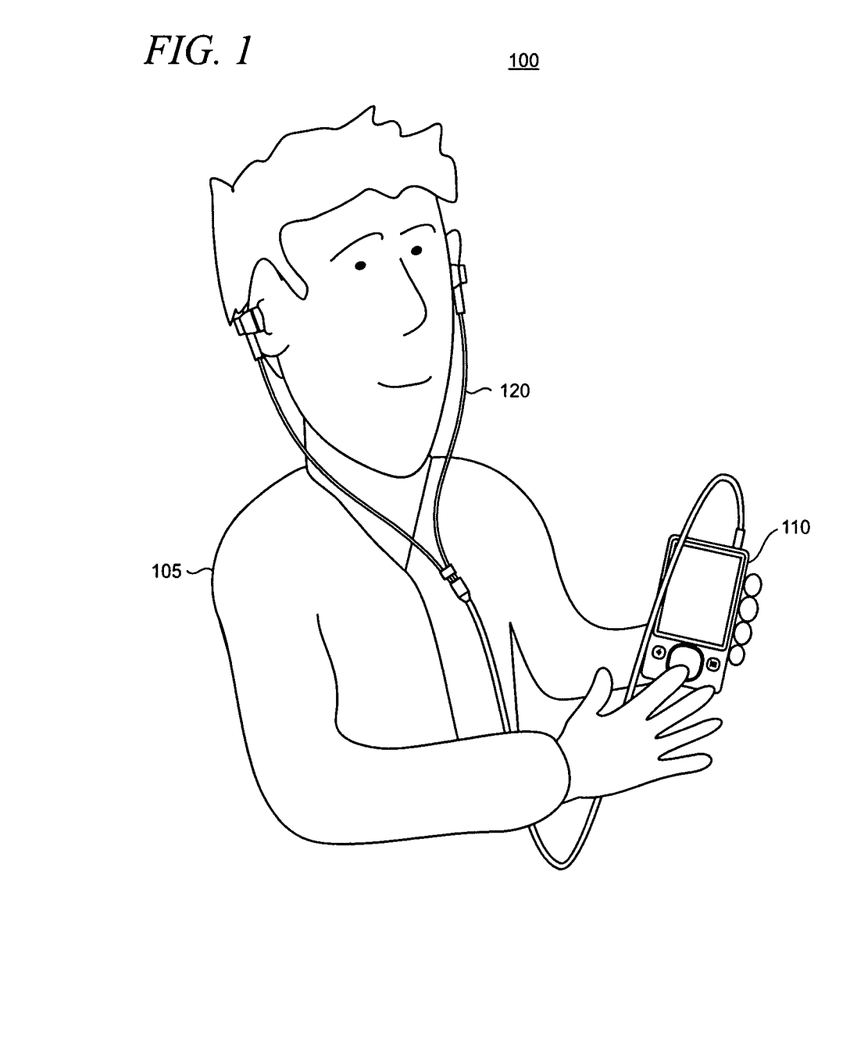
FIG. 1 shows an illustrative usage environment in which a user may listen to audio content and watch video content rendered by an illustrative personal media player.
Figure 2:
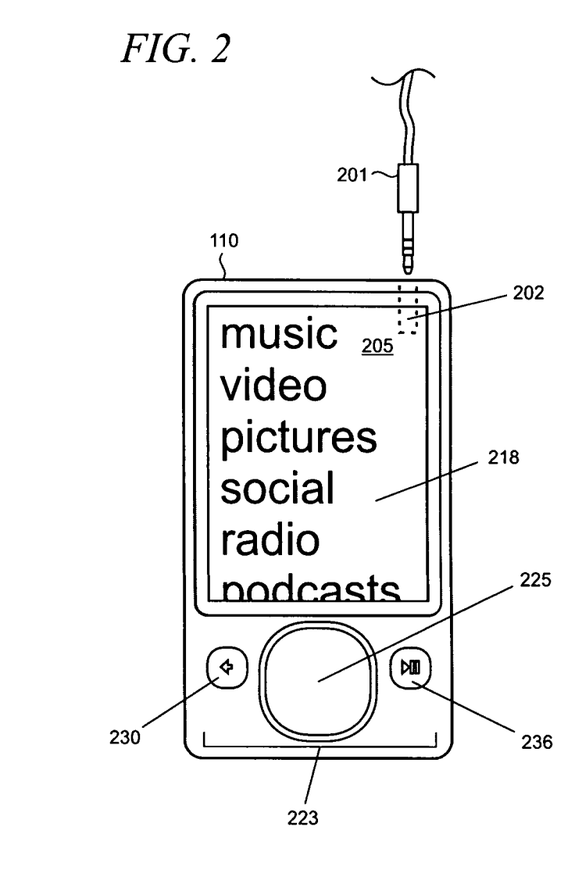
FIG. 2 shows a front view of an illustrative personal media player that supports a GUI on a display screen, as well as user controls.

FIG. 1 shows an illustrative portable device usage environment 100 in which a user 105 interacts with digital media content rendered by a personal media player 110. In this example, the personal media player 110 is configured with capabilities to play audio content such as MP3 files or content from over-the-air radio stations, display video and photographs, and render other content. The user 105 will typically use earphones 120 to enable audio content, such as music or the audio portion of video content, to be consumed privately (i.e., without the audio content being heard by others) and at volume levels that are satisfactory for the user while maintaining good battery life in the personal media player. Earphones 120 are representative of a class of devices used to render audio which may also be known as headphones, earbuds, headsets, and by other terms. Earphones 120 generally will be configured with a pair of audio speakers (one for each ear), or less commonly a single speaker, along with a means to place the speakers close to the user's ears. As shown in FIG. 2, the speakers are wired via cables to a plug 201. The plug 201 interfaces with an audio jack 202 in the personal media player 110.

FIG. 2 also shows a conventional GUI 205 that is rendered on a display screen 218, and user controls 223 that are built in to the personal media player 110. The GUI 205 uses menus, icons, and the like to enable the user 105 to find, select, and control playback of media content that is available to the player 110. In addition to supporting the GUI 205, the display screen 218 is also used to render video content, typically by turning the player 110 to a landscape orientation so that the long axis of the display screen 218 is parallel to the ground.

Figure 3:
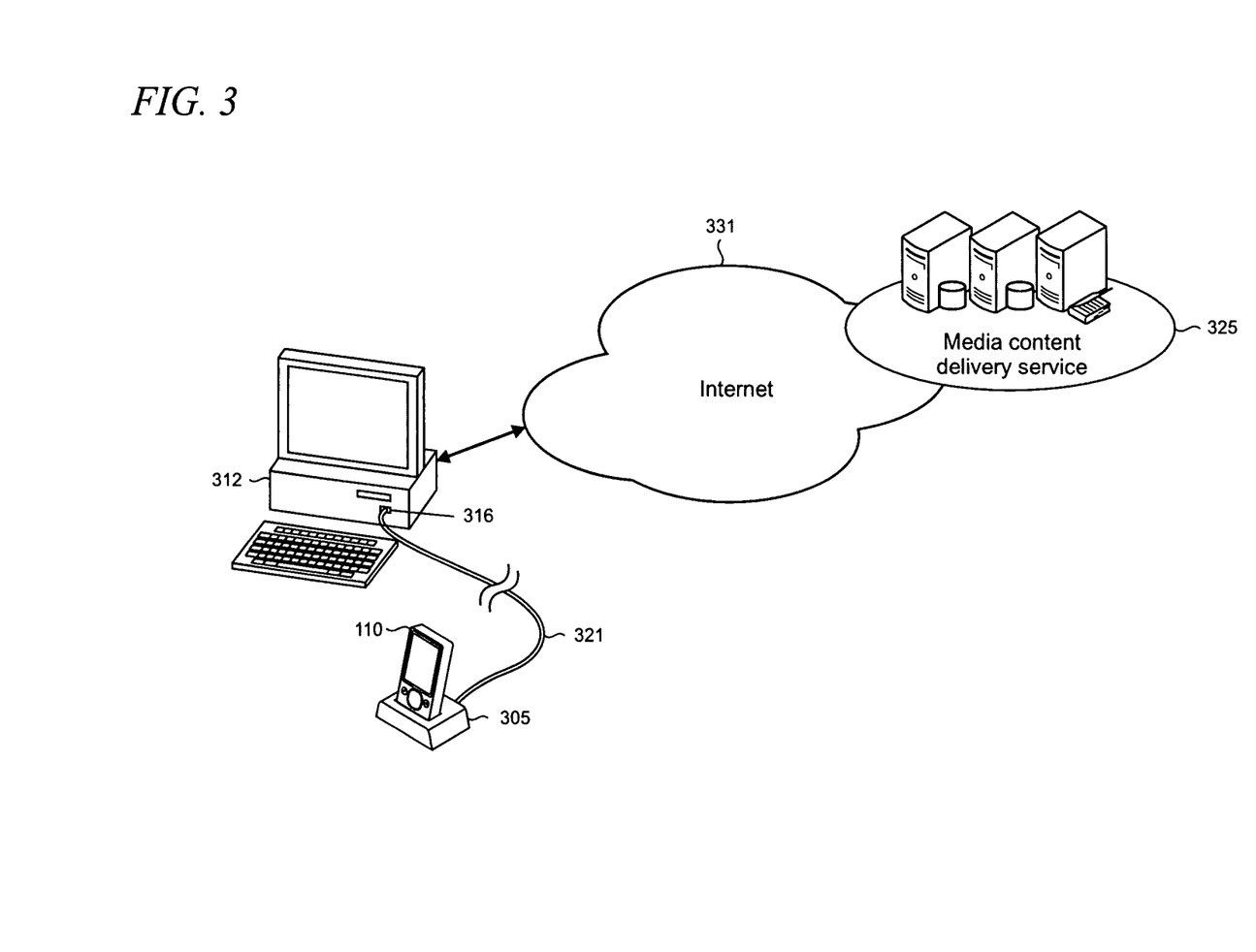
FIG. 3 shows the portable media player when docked in a docking station that is operatively coupled to a PC and where the PC is connected to a media content delivery service over a network such as the Internet.

FIG. 3 shows the personal media player 110 as typically inserted into a dock 305 for synchronization with a PC 312. Dock 305 is coupled to an input port 316 such as a USB (Universal Serial Bus) port with a synchronization ("sync") cable 321, in this example. Other arrangements may also be used to implement communications between the portable media player 110 and PC 312 including, for example, those employing wireless protocols such as Bluetooth, or Wi-Fi (i.e., the Institute of Electrical and Electronics Engineers, IEEE 802.11 standards family) that enable connection to a wireless network or access point.

In this example, the personal media player 110 is arranged to be operatively couplable with the PC 312 using a synchronization process by which data may be exchanged or shared between the devices. The synchronization process implemented between the PC 312 and personal media player 110 typically enables media content such as music, video, images, games, information, and other data to be downloaded from an on-line source or media content delivery service 325 over a network such as the Internet 331 to the PC 312. In this way, the PC 312 operates as an intermediary or proxy device between the service 325 and the personal media player 110. The media content provided by the service 325 will typically be organized and presented to the user 105 using multiple degrees of context as described in more detail below.

Returning to FIG. 2, the user controls 223, in this example, include a gesture pad 225, called a G-Pad, which combines the functionality of a conventional directional pad (i.e., a "D-pad") with a touch sensitive surface as described in U.S. Patent Application Ser. No. 60/987,399, filed Nov. 12, 2007, entitled "User Interface with Physics Engine for Natural Gestural Control," owned by the assignee of the present application and hereby incorporated by reference in its entirety having the same effect as if set forth in length. A "back" button 230 and a "play/pause" button 236 are also provided. However, other types of user controls may also be used depending on the requirements of a particular implementation.

Conventional GUIs typically provide menus or similar paradigms to enable a user to manipulate the user controls 223 to make selections of media content, control operation of the portable media player 110, set preferences, and the like. Content is generally arranged in a hierarchical manner, as represented by an illustrative hierarchy 400 shown in FIG. 4, with a representative menu item indicated by reference numeral 408. Hierarchies are commonly used, for example, to organize and present information and interactive experiences (collectively referred to herein as "content") through which a user may make a selection from various options presented. Users will typically "drill down" a chain of related menus to reveal successive screens until a particular content item is located.

Figure 4:
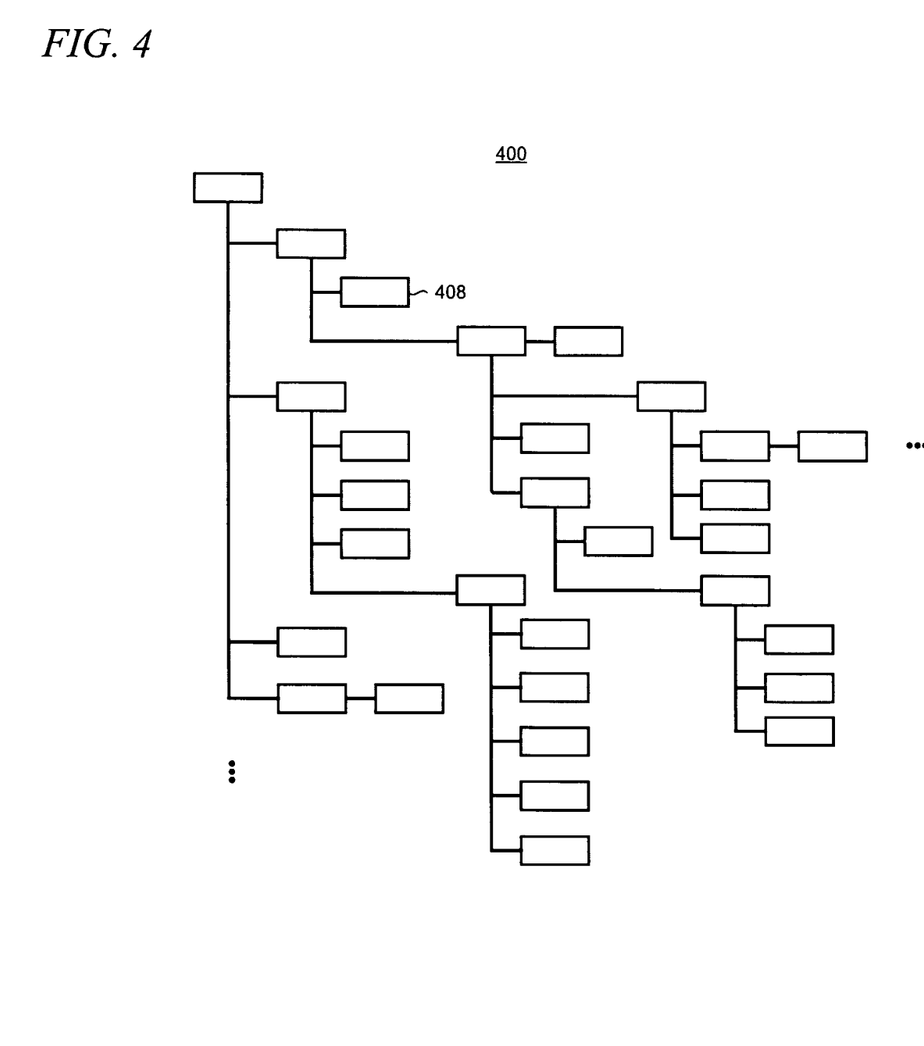

While often effective, the hierarchical nature of such GUIs tends to compartmentalize the presentation of the available content into discrete screens. The compartmentalization can often require that users move among one or more menus or go back and forth between menus to accomplish a desired action which may require a lot of interaction with the user controls 223. In addition, the GUI presentation tends to be "flat" in that it is typically organized using the two-dimensions of the display 218. To the extent that a third dimension is used, it often is implemented through the use of simple mechanisms such as pages (e.g., page 1 of 2, page 2 of 2, etc.). Overall, navigation in a hierarchically-arranged GUI can be non-intuitive and designers often face limitations in packaging the GUI content in order to avoid complex hierarchies in which users may easily get lost.

Figure 5:
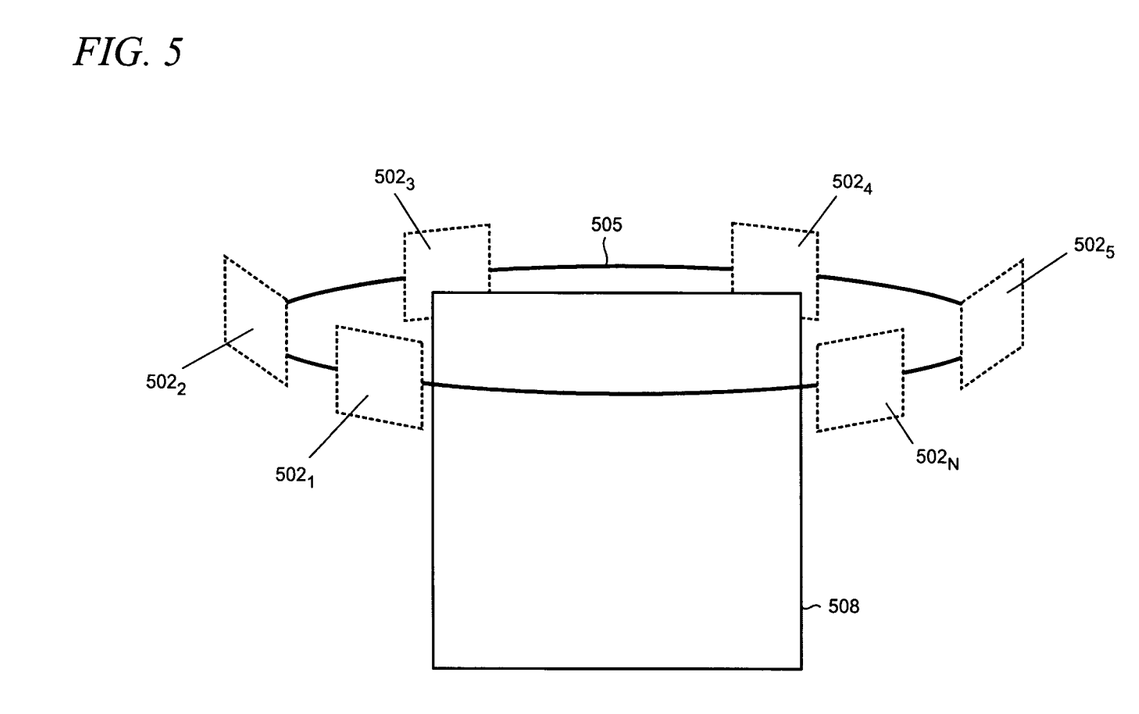
FIG. 5 shows an illustrative logical arrangement of context objects around a content item in a "halo"

By comparison to a flat, hierarchically-arranged content presentation, the present arrangement embeds pieces of content in a rich context. As shown in FIG. 5, this context (indicated by reference numbers $502_{1, 2 \ldots N}$ which point to the dashed rectangles) is logically arranged as a halo 505 around each content item (as representatively indicated by content item 508) that is available for consumption on the PC 312 or personal media player 110 by the user 105. It is noted that content items and context objects will typically be tailored to the particular platform on which they are presented. Thus, for example, it can be expected that the presentation and experiences will vary somewhat between the PC 312 and the personal media player 110. However, in many cases the same overall look and feel of the GUI and the organization of the context in halos will be maintained across platforms.

Figure 6:
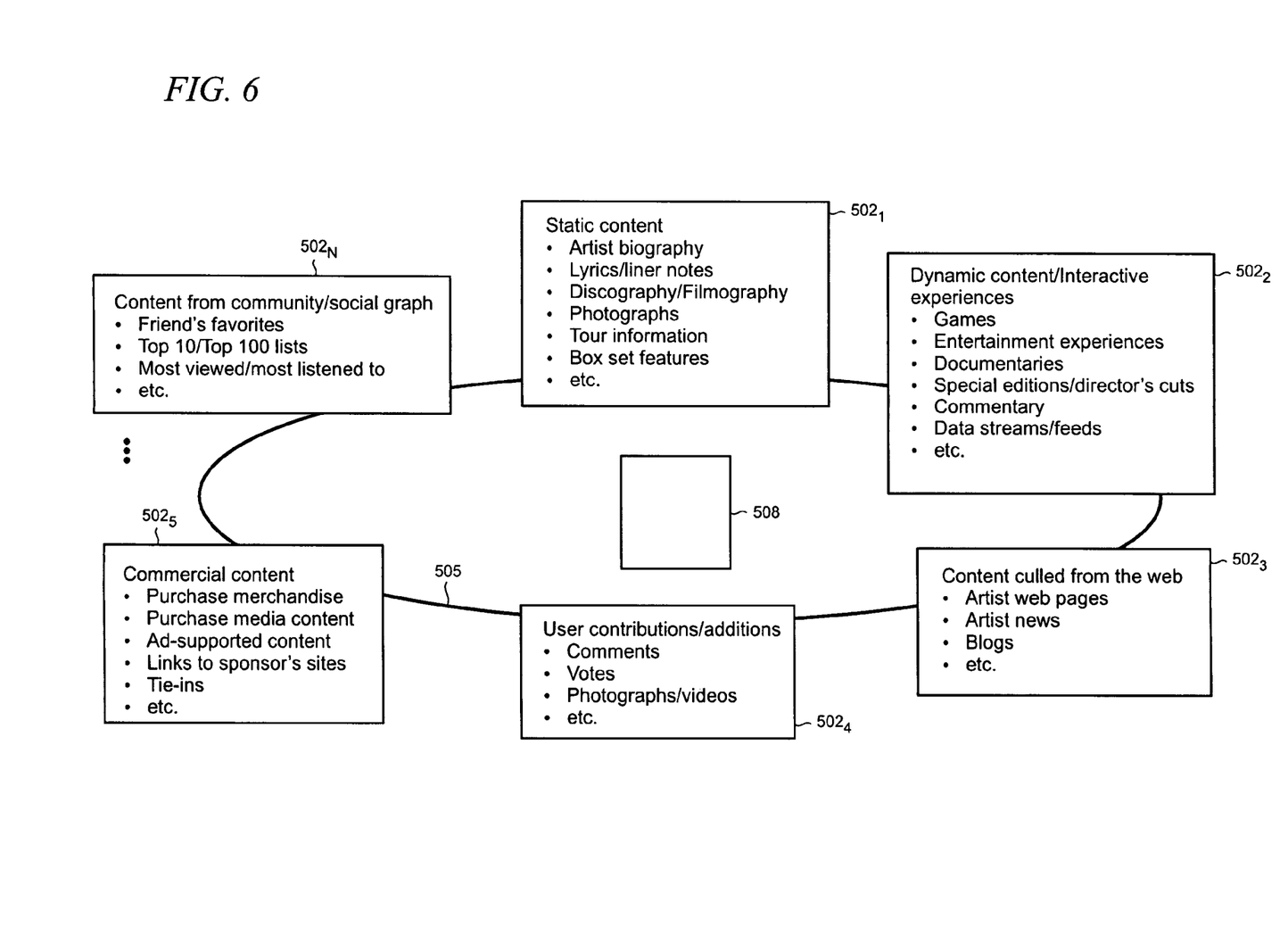
FIG. 6 shows illustrative examples of elements that may be included as rich context for a content item.

As shown in FIG. 6, the context objects 502 may include a wide variety of rich context that is associated with each content item 508 such as a piece of music or video content. For example, context objects may represent traditional static content $502_1$ including the biography the artist, lyrics and liner notes, discography/filmography, photographs, information pertaining to concerts and tours, and enhanced features such as those that are typically associated with "box sets" or "extra features" in traditionally retailed media. It is emphasized, however, that the listing of static content here is intended to be illustrative, and that other types and kinds of static content may also be utilized as required to meet the needs of a particular implementation.

Context objects may also be represented by dynamic content $502_2$ that is typically used to support various types of interactive experiences for the user 105. Dynamic content $502_2$ may include, for example, games, entertainment experiences, documentaries, special editions or director's cuts of media content, commentaries, and information from external data streams or feeds. Content culled from the web $502_3$ may also be used as context objects. Such content may include, for example web pages for an artist, news, blogs (i.e., web logs), and other information. These listings are not intended to be exhaustive, and other types and kinds of dynamic content may also be utilized as appropriate.

Context objects may also include contributions and/or additions $502_4$ from the users of the media content delivery service 325. Such contributions may include, for example, user comments, votes (e.g., "thumbs up/thumbs down"), photographs and videos uploaded by the users, and the like. Commercial content $502_5$ may also be used as context objects. Such commercial content may include, for example, opportunities to purchase merchandise or other media content, view advertisement-supported content, tie-ins to products and services, and links to content sponsor's websites. Various other types and kinds of commercial content may also be used to support various types of transactions and monetization methodologies as may be required to meet the needs of a particular implementation. Portals may supported by the GUIs on the PC 312 and personal media player 110 to support the completion of secure transactions such as media content purchases through interaction with the commercial content $502_5$.

Content from the user community and/or a social graph of a particular user $502_N$ may also be used as context objects in this example. A social graph is commonly defined as the network of connections and relationships among people using the service including friends of the consumer, and friends of friends, etc.). Such content may include, for example, favorite content of the user's friends, "Top 10" or "Top 100" lists, most viewed videos, most listened to songs, and other types of content. Activities of the user 105 may also be tracked, in some cases, so that the activities may be included as community and/or social statistics for other users of the service 325.

Context objects will typically be kept fresh and up to date by the media content delivery service 325 on both the PC 312 and personal media player 110. In this way, the user 105 can be kept assured that the experiences provided by the devices are always current.

One illustrative usage scenario involving the context halo 505 includes the user 105 who is listening to a track of a favorite artist on the PC 312 or on the personal media player 110. The user 105, by interacting with the context halo 505, may see the lyrics to the song, read about or see a video about the making of the album in which the track is included, read the biography of the artist, review official photographs from the artist's website, and see photographs taken by fans at the artist's concerts. The user may also review the latest gossip about the artist on a blog, see an update on the latest album tour, vote on the best song in the album, leave a comment in a fan forum about the artist, upload a photograph or a video taken at a fan club meeting, listen to a free track or sample of music by the artist which is sponsored by an advertiser, interact with the sponsor's advertising, read fan letters, play a game involving an avatar or character that represents the artist, buy merchandise such as T-shirts, memorabilia, and so on.

A second illustrative usage scenario involving the context halo 505 includes the user 105 who is watching a video of an episode of a favorite television show on the PC 312 or on the personal media player 110. The user 105, by interacting with the context halo 505, may pause for the video presentation and pull up an interactive enhanced story guide for that episode, and find photographs, actor biographies, director's commentary, and the like to watch or read. In addition, the user 105 may capture a screen shot of the video, add a comment, and then send it to a friend and perhaps include a live link to the entire episode. The user 105 may also play a mini game associated with the television show, vote on the user's favorite episode, review a soundtrack associated with the show and make purchases of songs that are liked, see what other shows and movies the actor has been in, and then rent or purchase one of those movies, and so on.

It is emphasized that the particular context objects listed in the illustrative scenarios above are intended to be illustrative and are not exhaustive.

Figure 7:
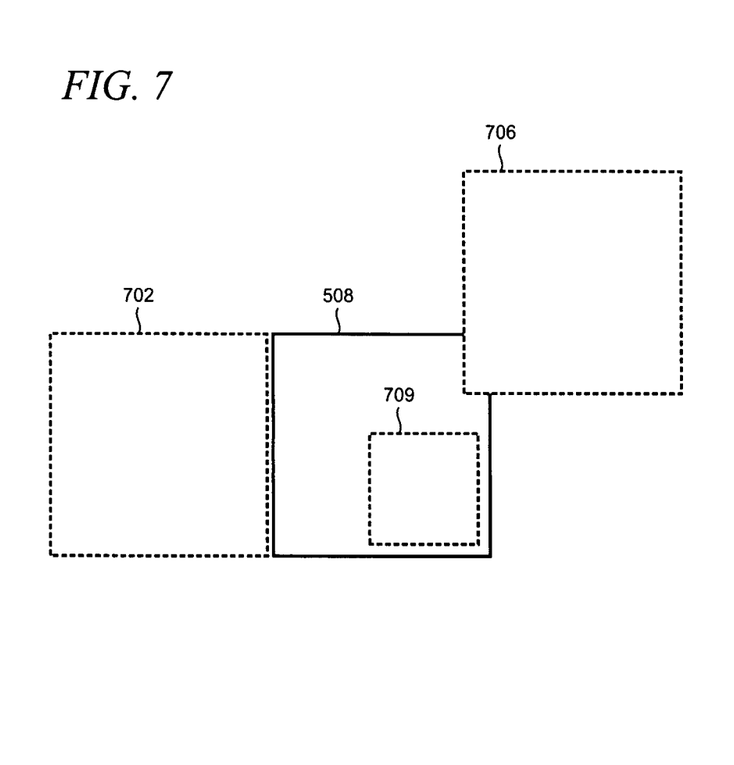
FIGS. 7 and 8 show illustrative examples of how context objects may be accessed from a content items using respective GUIs that run on a PC or personal media player.
Figure 8:
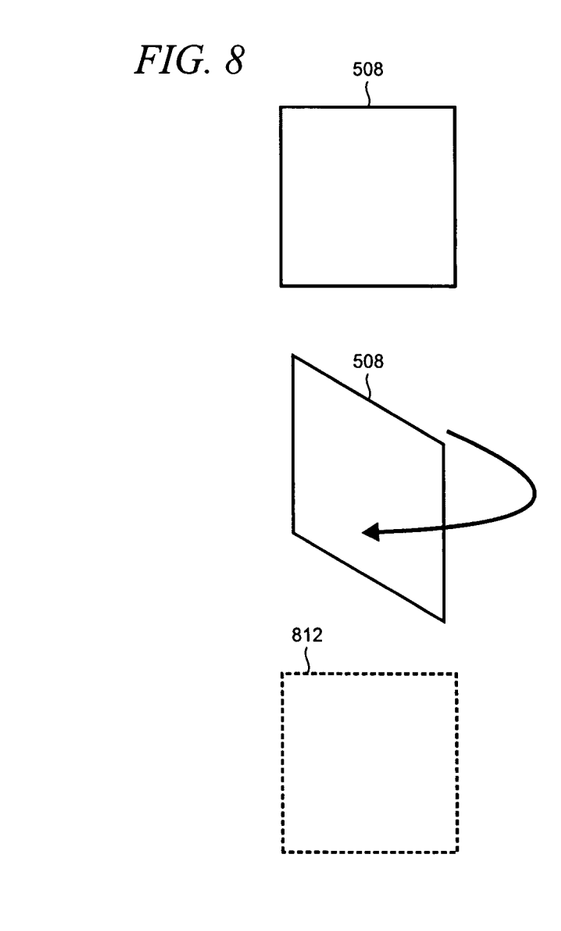

FIGS. 7 and 8 show illustrative examples of how context objects 502 may be accessed from content items 508 using respective GUIs that run on the PC 312 or personal media player 110. In FIG. 7, a context object 702 is visually presented next to the content item 508 but it is off to the side of the display screen so that it is just out of view. However, the user 105 can manipulate the user controls on the PC 312 or player 110 in order to easily pull the context object 702 into view. Alternatively, a context object 706 is arranged so that most of it is off to the corner of the display screen, but a portion of it is visible on the content item 508. In this case, the user 105 can grab a corner of the context object 706 and pull all of it into view.

In some implementations, the content item 508 in a context object may be displayed simultaneously, for example next to each other or stacked one on top of the other. As shown in FIG. 7, a context object 709 is shown in a reduced view (e.g., like a thumbnail) over the content item 508. By selecting the context object 709, the user 105 can expand the object to bring it into full view.

FIG. 8 shows another way to navigate between content items and context objects in a GUI. In this example, the user 105 manipulates the controls on a device to flip the content item 508 to expose its virtual back surface which is configured to be a context object 812. It is emphasized that the methods of navigation shown in FIGS. 7 and 8 are illustrative and that other navigation configurations may also be utilized as appropriate to meet the needs of a given implementation.

Figure 9:
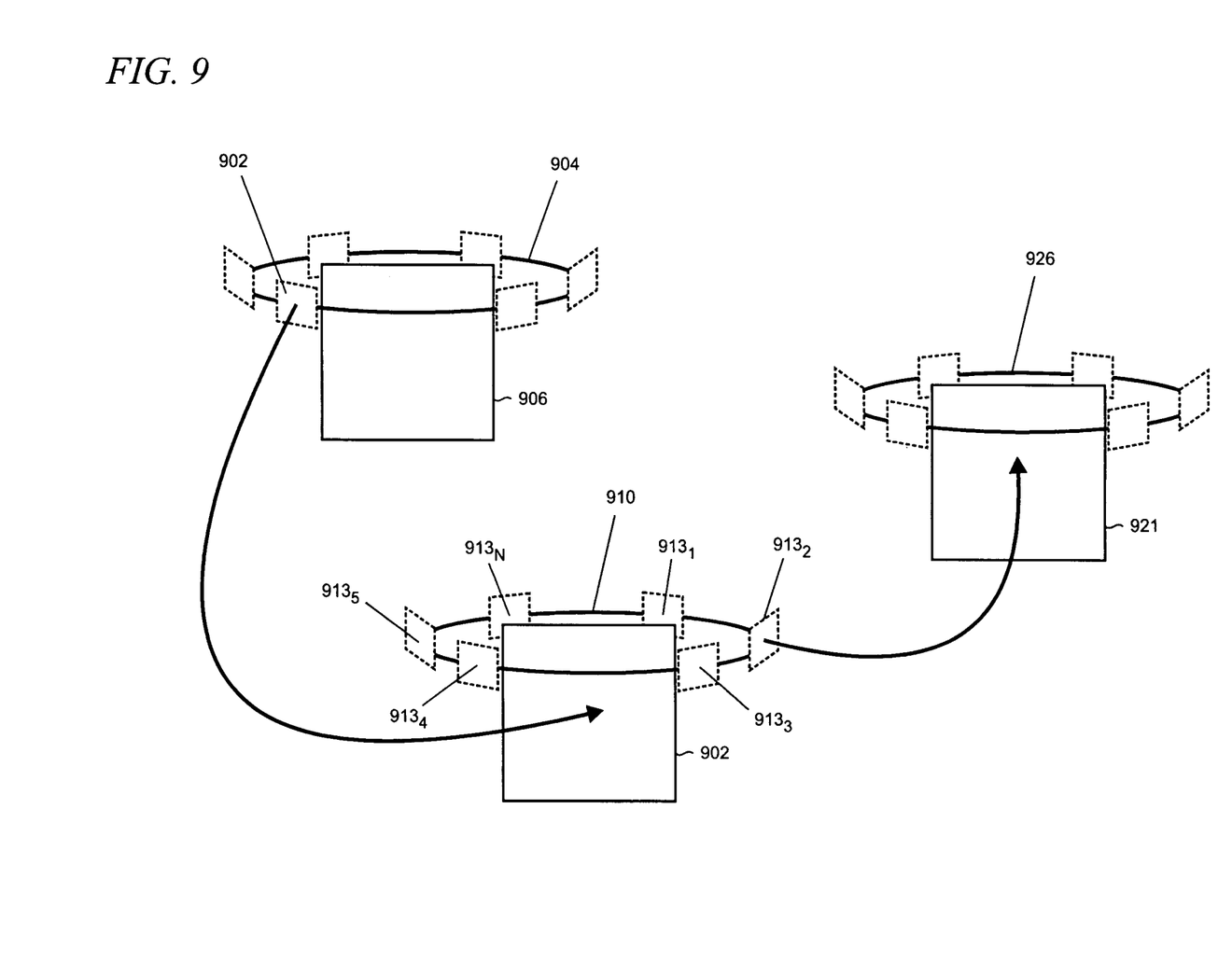
FIG. 9 shows an illustrative path by which a user may navigate through cloud-based content where each piece of content is surrounded by its own halo of context.

As shown in FIG. 9, context halos are dynamic so that each time a user navigates from one content item to an associated piece of context, that context object morphs into content that has a new halo of context that is created around it. For example, the user 105 may navigate to a context object 902 in a halo 904 from a content item 906 like a video clip of a television show that is being rendered on the display of the PC 312 or personal media player 110. Here, the context object 902 may be a blooper or an outtake that now operates as content in its own right as the user 105 watches it on the display screen of the device. A new halo 910 of associated context objects $913_{1, 2 \ldots N}$ is then created for the object 902. The context objects 913 could include, for example, additional bloopers or outtakes as well as a context object that would allow navigation back to the original video clip.

In this example, the user 105 has selected context object $913_2$ which could be director's commentary for the television show. As above, the selected context object $913_2$ will begin to render in the main display and thus become content in its own right (as indicated by reference numeral 921). A new halo of context objects 926 is then associated with the item 921 from which the user may discover additional related content and experiences.

In many implementations, the halos 904, 910 and 926 will have overlapping context objects. However, in other implementations the halos will be unique.

Generally, as noted above, the experience will typically be arranged to be similar on both the PC and personal media player platforms. However, while features and functionalities provided by the present arrangement for providing multiple degrees of context described above will typically have equal applicability to both PC and personal media player platforms, they will be subject to the differences in resources and processing powers that are available to each. In particular, as the personal media player 110 is arranged as a portable device, it is not always enabled with connectivity to the PC 312 and/or the media content delivery service 325.

Figure 10:
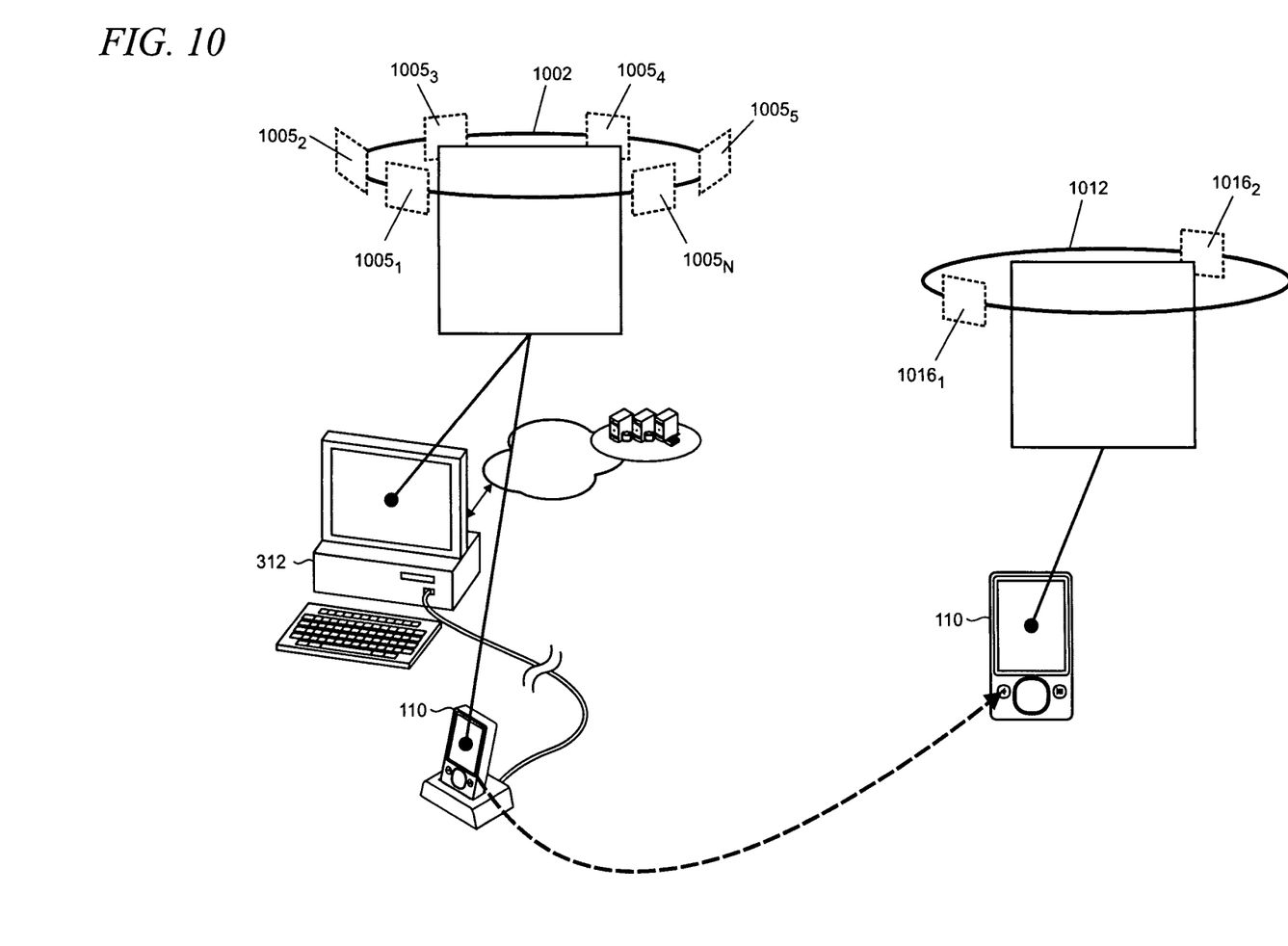
FIG. 10 shows an illustrative arrangement by which a halo of context is reduced in scope for content supported by a personal media player that is disconnected from the cloud.

Accordingly, as shown in FIG. 10, the user 105 will typically be able to maintain a large halo 1002 of context objects $1005_{1, 2 \ldots N}$ for both the PC 312 and personal media player 110 when on-line connectivity is in place. By comparison, when the player 110 is undocked and moves into a disconnected state when the user is on the go, a more limited halo 1012 will be supported having fewer context objects $1016_1$ and $1016_2$. The number of context objects supported when the personal media player 110 is disconnected can vary. The particular context objects provided will typically be harvested from the content that is stored on the player 110 so that the user may interact with the context objects to find and interact with new content even though a live connection to the media content delivery service 325 is no longer live.

Although the experiences provided to the user when the personal media is in a disconnected state will typically be more limited, various techniques may be utilized to ensure the most enriching experiences possible. For example, the user's interactions with the player 110 may be tracked and stored to support various predictive algorithms so that context objects that the user will likely access may be cached for later use.

In other cases, the user 105 may be prompted to instruct the player 110 which types of context objects the user is going to interact with in the future so that the player can go to the service 325 and pre-fetch the needed objects. For example, a menu system or other interactive experience may be supported by the player 110 to guide the user through anticipated future usage scenarios and identify relevant context objects to be pre-fetched.

Figure 11:
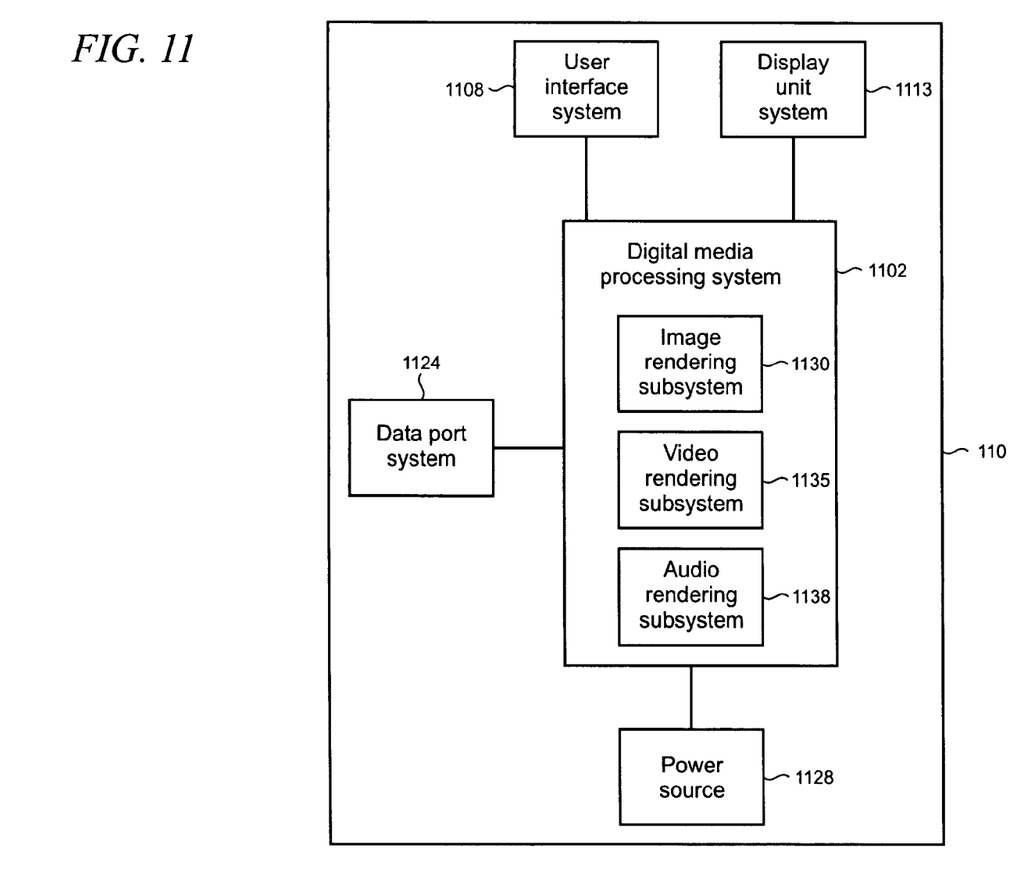
FIG. 11 is a simplified block diagram that shows various functional components of an illustrative example of a personal media player.

FIG. 11 is a simplified block diagram that shows various illustrative functional components of the personal media player 110. The functional components include a digital media processing system 1102, a user interface system 1108, a display unit system 1113, a data port system 1124, and a power source system 1128. The digital media processing system 1102 further comprises an image rendering subsystem 1130, a video rendering subsystem 1135, and an audio rendering subsystem 1138.

The digital media processing system 1102 is the central processing system for the personal media player 110 and provides functionality that is similar to that provided by the processing systems found in a variety of electronic devices such as PCs, mobile phones, PDAs, handheld game devices, digital recording and playback systems, and the like.

Some of the primary functions of the digital media processing system 1102 may include receiving media content files downloaded to the player 110, coordinating storage of such media content files, recalling specific media content files on demand, and rendering the media content files into audio/visual output on the display for the user 105. Additional features of the digital media processing system 1102 may also include searching external resources for media content files, coordinating DRM (digital rights management) protocols for protected media content, and interfacing directly with other recording and playback systems.

As noted above the digital media processing system 1102 further comprises three subsystems: the video rendering subsystem 1135 which handles all functionality related to video-based media content files, which may include files in MPEG (Moving Picture Experts Group) and other formats; the audio rendering subsystem 1138 which handles all functionality related to audio-based media content including, for example, music in the commonly-utilized MP3 format and other formats; and the image rendering subsystem 1130 which handles all functionality related to picture-based media content, including for example JPEG (Joint Photographic Experts Group), GIF (Graphic Interchange Format), and other formats. While each subsystem is shown as being logically separated, each may in fact share hardware and software components with each other and with the rest of the personal media player 110, as may be necessary to meet the requirements of a particular implementation.

Functionally coupled to the digital media processing system 1102 is the user interface system 1108 through which the user 105 may exercise control over the operation of the personal media player 110. A display unit system 1113 is also functionally coupled to the digital media processing system 1102 and may comprise the display screen 218 (FIG. 2). Audio output through the audio jack 202 (FIG. 2) for playback of rendered media content may also be supported by display unit system 1113. The display unit system 1113 may also functionally support and complement the operation of the user interface system 1108 by providing visual and/or audio output to the user 105 during operation of the player 110.

The data port system 1124 is also functionally coupled to the digital media processing system 1102 and provides a mechanism by which the personal media player 110 can interface with external systems in order to download media content. The data port system 1124 may comprise, for example, a data synchronization connector port, a network connection (which may be wired or wireless), or other means of connectivity.

The personal media player 110 has a power source system 1128 that provides power to the entire device. The power source system 1128 in this example is coupled directly to the digital media processing system 1102 and indirectly to the other systems and subsystems throughout the player. The power source system 1128 may also be directly coupled to any other system or subsystem of the personal media player 110. Typically, the power source may comprise a battery, a power converter/transformer, or any other conventional type of electricity-providing power source.

Figure 12:
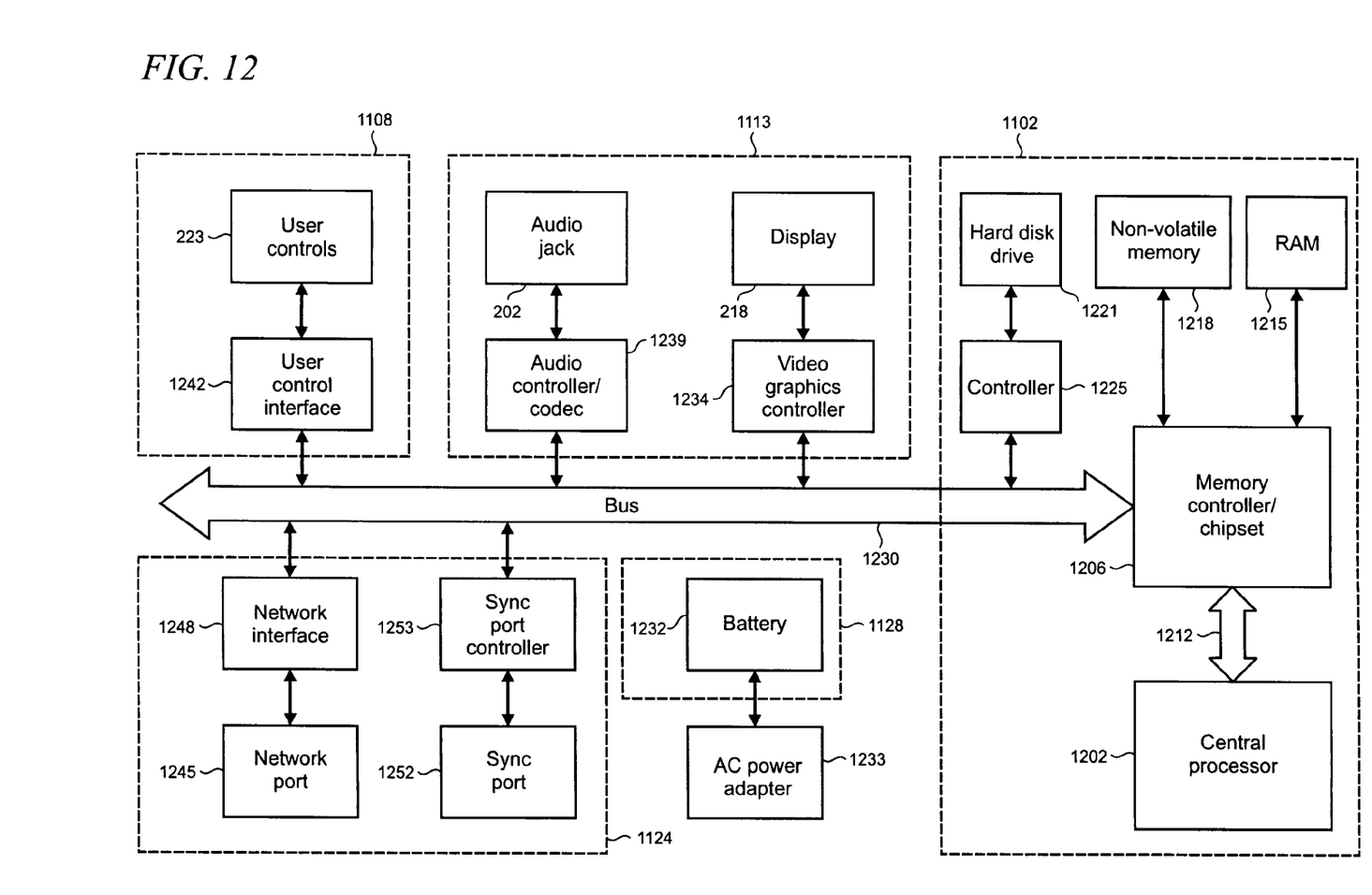
FIG. 12 is a simplified block diagram that shows various physical components of an illustrative example of a personal media player.

FIG. 12 is a simplified block diagram that shows various illustrative physical components of the personal media player 110 based on the functional components shown in FIG. 11 and described in the accompanying text (which are represented in FIG. 12 by dashed lines) including the digital media processing system 1102, the user interface system 1108, the display unit system 1113, the data port system 1124, and the power source system 1128. While each physical component is shown as included in only a single functional component in FIG. 12, the physical components may, in fact, be shared by more than one functional component.

The physical components include a central processor 1202 coupled to a memory controller/chipset 1206 through, for example, a multi-pin connection 1212. The memory controller/chipset 1206 may be, in turn, coupled to random access memory ("RAM") 1215 and/or non-volatile memory 1218 such as solid-state or Flash memory. These physical components, through connectivity with the memory controller/chipset 1206, may be collectively coupled to a hard disk drive 1221 (or other solid-state memory) via a controller 1225, as well as to the rest of the functional component systems via a system bus 1230.

In the power supply system 1128, a rechargeable battery 1232 may be used to provide power to the components using one or more connections (not shown). The battery 1232, in turn, may also be coupled to an external AC power adapter 1233 or receive power via the sync cable 321 when it is coupled to the PC 312 (FIG. 3).

The display screen 218 is associated with a video graphics controller 1234. The video graphics controller will typically use a mix of software, firmware, and/or hardware, as is known in the art, to implement the GUI on the display screen 218. Along with the audio jack 202 and its associated audio controller/codec 1239, these components comprise the display unit system 1113 and may be directly or indirectly connected to the other physical components via the system bus 1230.

The user controls 223 are associated with a user control interface 1242 in the user interface system 1108 that implements the user control functionality that is used to support the interaction with the GUI as described above. A network port 1245 and associated network interface 1248, along with the sync port 1252 and its associated controller 1253 may constitute the physical components of the data port system 1124. These components may also directly or indirectly connect to the other components via the system bus 1230.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for organizing media content and related contextual information and experiences, the method comprising the steps of:
    logically surrounding a first content item with a first halo comprising a plurality of context objects, the first content item representing an item of entertainment, the context objects being contextually related to the first content item and representing at least one of media content, information, data, or an interactive experience for a user of the device, the context objects being displayable on a display screen on the device;
    supporting one or more user controls for interacting with the context objects in the first halo so that manipulating the one or more controls enables navigation between the first content item and the context objects in the first halo, wherein the manipulating comprises pulling a context object into focus, the context object being simultaneously displayed with the first content item and stacked on top of the first content item; and
    enabling interaction with a context object by the user to facilitate control over a user experience supported by the device,
        wherein a selection of a context object in the first halo causes the selected context object to morph into a second content item, and also causes a further step of dynamically generating a second halo surrounding the second content item and comprising a plurality of context objects, the context objects in the second halo being contextually related to the second content item, and
        further wherein a user's interactions with the device are tracked, stored and used to determine context objects likely to be accessed by the user, wherein such determined context objects are generated in at least one of the first halo and second halo.

2. The method of claim 1 in which the context objects represent at least one of static content, dynamic content, content culled from one or more websites, user contributions or additions, commercial content, content associated with a community, or content associated with a social graph of a user.

3. The method of claim 1 in which a portion of the context object is positioned off the display screen.

4. The method of claim 1 in which the context object is shown as a thumbnail image located on top of the first content item.

5. A personal media player, comprising:
    a display screen configured for rendering text and graphics;
    user controls;
    a digital media processing system interfacing with the display screen to render a GUI showing one or more content items; and
    memory bearing computer-readable instructions which, when executed by one or more processors in the personal media player i) implement the GUI on the display screen, the GUI arranged for displaying a plurality of context objects that are logically populated within a plurality of halos, each of the halos surrounding a content item to provide contextual meaning to the content item, and ii) enable the user controls to be manipulated by the user to navigate to context objects that are displayable on the display screen, wherein the manipulating comprises pulling a context object into focus, the context object being simultaneously displayed with the first content item and stacked on top of the first content item,
        wherein said memory bearing computer-readable instructions, when executed by one or more processors in the personal media player, are operable such that a selection of a context object in a first halo, the first halo surrounding a first content item, causes the selected context object to become a second content item, and also causes a further step of dynamically generating a second halo surrounding the second content item and comprising a plurality of context items, the context objects in the second halo being contextually related to the second content item, and
        further wherein a user's interactions with the device are tracked, stored and used to determine context objects likely to be accessed by the user, wherein such determined context objects are generated in at least one of the first halo and second halo.

6. The method of claim 1 in which the interactive user experience comprises discovery of new content items.

7. The method of claim 1 in which the device is one of PC, mobile phone, PDA, media player, handheld game device, smart phone, ultra-mobile computer, or a device having a combination of functionalities provided therein.

8. The method of claim 5 in which the user controls are enabled to be manipulated to flip a content item over to expose a context object on its reverse side.

9. The personal media player of claim 5 in which the user controls comprise a D-pad supporting control actuation in a center direction, left direction, right direction, up direction, and down direction.

10. The personal media player of claim 5 in which the user controls comprise a G-pad comprising a switch and a touch sensitive surface, the G-pad replicating functionality of a D-pad by supporting control actuation in a center direction, left direction, right direction, up direction, and down direction.

11. The personal media player of claim 5 further including a synchronization port by which the portable media player may be synchronized with an intermediary device to obtain context objects from a remote service.

12. The personal media player of claim 5 in which the digital media processing system is configured for receiving media content, storing the media content, and rendering portions of the media content on the display screen.

13. The personal media player of claim 5 in which the manipulation comprises navigating from a content item to a context object in an iterative manner.

* * * * *